US006172142B1

(12) United States Patent
Lorenz et al.

(10) Patent No.: US 6,172,142 B1
(45) Date of Patent: Jan. 9, 2001

(54) THERMAL TRANSFER MEDIUM WITH PHASE ISOLATED REACTIVE COMPONENTS

(75) Inventors: Michael A. Lorenz, Miamisburg; Joseph D. Roth, Springboro, both of OH (US)

(73) Assignee: NCR Corporation, Dayton, OH (US)

( * ) Notice: Under 35 U.S.C. 154(b), the term of this patent shall be extended for 0 days.

(21) Appl. No.: 09/287,789

(22) Filed: Apr. 7, 1999

Related U.S. Application Data

(60) Division of application No. 08/811,652, filed on Mar. 5, 1997, now Pat. No. 5,952,098, which is a continuation-in-part of application No. 08/620,737, filed on Mar. 25, 1996, now abandoned.

(51) Int. Cl.$^{7}$ .......................... C08K 5/101; C08L 63/02

(52) U.S. Cl. .......................... 523/455; 523/463; 523/468; 525/438; 525/455; 525/463; 525/468

(58) Field of Search .................................... 523/455, 463, 523/468; 525/438, 455, 463, 468

(56) References Cited

U.S. PATENT DOCUMENTS

| | | | |
|---|---|---|---|
| 3,663,278 | 5/1972 | Blose et al. | 428/480 |
| 4,315,643 | 2/1982 | Tokunaga et al. | 282/27.5 |
| 4,403,224 | 9/1983 | Wirnowski | 346/1.1 |
| 4,463,034 | 7/1984 | Tokunaga et al. | 427/256 |
| 4,628,000 | 12/1986 | Talvalkar et al. | 428/341 |
| 4,687,701 | 8/1987 | Knirsch et al. | 428/216 |
| 4,707,395 | 11/1987 | Ueyama et al. | 428/212 |
| 4,777,079 | 10/1988 | Nagamoto et al. | 428/212 |
| 4,778,729 | 10/1988 | Mizobuchi | 428/484 |
| 4,923,749 | 5/1990 | Talvalkar | 428/341 |
| 4,975,332 | 12/1990 | Shini et al. | 428/500 |
| 4,983,446 | 1/1991 | Taniguchi et al. | 428/216 |
| 4,988,563 | 1/1991 | Wehr | 428/341 |
| 5,128,308 | 7/1992 | Talvalkar | 428/484 |
| 5,240,781 | 8/1993 | Obata et al. | 428/488.4 |
| 5,248,652 | 9/1993 | Talvalkar | 503/201 |
| 5,328,754 | 7/1994 | Yuyama et al. | 428/212 |

FOREIGN PATENT DOCUMENTS 0111004 6/1984 (EP) .

OTHER PUBLICATIONS

Patent Abstracts of Japan, vol. 17, No. 286 (M–1422), Jun. 2, 1993 & JP 05 016533 A (Ricoh K.K.), Jan. 26, 1993. (English translation included).

*Primary Examiner*—Robert Dawson
*Assistant Examiner*—D. Aylward
(74) *Attorney, Agent, or Firm*—Millen White Zelano & Branigan PC

(57) ABSTRACT

There is provided by the present invention a thermal transfer ribbon which employs reactive binder components that increase in molecular weight when heated during transfer to provide images with high scratch and smear resistance. The reactive components comprise an epoxy resin binder and crosslinker for the epoxy resin binder which are maintained in separate phases within the thermal transfer layer until exposed to a thermal print head through the use of a coating formulation solvent which does not solubilize either the crosslinker or the epoxy resin binder or both.

11 Claims, 1 Drawing Sheet

THERMAL TRANSFER MEDIUM WITH PHASE ISOLATED REACTIVE COMPONENTS

This application is a divisional of application Ser. No. 08/811,652 filed on Mar. 5, 1997 U.S. Pat. No. 5,952,098 which is a CIP of Ser. No. 08/620,737 filed on Mar. 25, 1996, abandoned.

FIELD OF THE INVENTION

The present invention relates to thermal transfer printing wherein images are formed on a receiving substrate by heating extremely precise areas of a print ribbon with thin film resistors. This heating of the localized area causes transfer of ink or other sensible material from the ribbon to the receiving substrate. The sensible material is typically a pigment or dye which can be detected optically or magnetically.

BACKGROUND OF THE INVENTION

Thermal transfer printing has displaced impact printing in many applications due to advantages such as the relatively low noise levels which are attained during the printing operation. Thermal transfer printing is widely used in special applications such as in the printing of machine readable bar codes and magnetic alpha-numeric characters. The thermal transfer process provides great flexibility in generating images and allows for broad variations in style, size and color of the printed image. Representative documentation in the area of thermal transfer printing includes the following patents.

U.S. Pat. No. 3,663,278, issued to J. H. Blose et al. on May 16, 1972, discloses a thermal transfer medium comprising a base with a coating comprising of cellulose polymer, thermoplastic aminotriazine-sulfonamide-aldehyde resin, plasticizer and a "sensible" material such as a dye or pigment.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,463,034, issued to Y. Tokunaga et al. on Jul. 31, 1984, discloses a heat-sensitive magnetic transfer element having a hot melt or a solvent coating.

U.S. Pat. No. 4,628,000, issued to S. G. Talvalkar et al. on Dec. 9, 1986, discloses a thermal transfer formulation that includes an adhesive-plasticizer or sucrose benzoate transfer agent and a coloring material or pigment.

U.S. Pat. No. 4,687,701, issued to K. Knirsch et al. on Aug. 18, 1987, discloses a heat sensitive inked element using a blend of thermoplastic resins and waxes.

U.S. Pat. No. 4,707,395, issued to S. Ueyama et al., on Nov. 17, 1987, discloses a substrate, a heat-sensitive releasing layer, a coloring agent layer, and a heat-sensitive cohesive layer.

U.S. Pat. No. 4,777,079, issued to M. Nagamoto et al. on Oct. 11, 1988, discloses an image transfer type thermosensitive recording medium using thermosoftening resins and a coloring agent.

U.S. Pat. No. 4,778,729, issued to A. Mizobuchi on Oct. 18, 1988, discloses a heat transfer sheet comprising a hot melt ink layer on one surface of a film and a filling layer laminated on the ink layer.

U.S. Pat. No. 4,923,749, issued to Talvalkar on May 8, 1990, discloses a thermal transfer ribbon which comprises two layers, a thermosensitive layer and a protective layer, both of which are water based.

U.S. Pat. No. 4,975,332, issued to Shini et al. on Dec. 4, 1990, discloses a recording medium for transfer printing comprising a base film, an adhesiveness improving layer, an electrically resistant layer and a heat sensitive transfer ink layer.

U.S. Pat. No. 4,983,446, issued to Taniguchi et al. on Jan. 8, 1991, describes a thermal image transfer recording medium which comprises as a main component, a saturated linear polyester resin.

U.S. Pat. No. 4,988,563, issued to Wehr on Jan. 29, 1991, discloses a thermal transfer ribbon having a thermal sensitive coating and a protective coating. The protective coating is a wax-copolymer mixture which reduces ribbon offset.

U.S. Pat. Nos. 5,128,308 and 5,248,652, issued to Talvalkar, each disclose a thermal transfer ribbon having a reactive dye which generates color when exposed to heat from a thermal transfer printer.

And, U.S. Pat. No. 5,240,781, issued to Obatta et al., discloses an ink ribbon for thermal transfer printers having a thermal transfer layer comprising a wax-like substance as a main component and a thermoplastic adhesive layer having a film forming property.

There are some limitations on the applications for thermal transfer printing. For example, the properties of the thermal transfer formulation which permit transfer from a carrier to a receiving substrate can place limitations on the permanency of the printed matter. Printed matter from conventional processes can smear or smudge, especially when subjected to a subsequent sorting operation. Additionally, where the surface of a receiving substrate is subject to scratching, the problem is compounded. This smearing can make character recognition such as optical character recognition or magnetic ink character recognition difficult and sometimes impossible. In extreme cases, smearing can make it difficult to read bar codes.

Many attempts have been made to provide high integrity thermal transfer printing which is resistant to scratching and smearing, some of which are described above. For example, it is generally known to those skilled in the art that resin binders and/or waxes with higher melting points can provide a higher degree of scratch and smear resistance. However, higher print head energies are necessary to achieve the desired flow to promote transfer and adhesion to a receiving substrate. In U.S. Pat. Nos. 5,128,308 and 5,248,652 Talvalkar provides print with improved smear resistance without the need for higher print head energies by employing a thermal transfer formulation which contains thermally reactive phenolic resins and Leuco dyes. These reactive components are said to provide higher intensity print with improved resistance to scratch and smear. The reaction apparently immobilizes the dye. There is no indication the melting point or molecular weight of the resin binder are significantly affected. Multilayer thermal transfer media have been proposed wherein two reactive components are incorporated in separate layers to prevent reaction prior to use. The layers soften when exposed to a thermal print head and the reactive components therein polymerize. Such multilayer thermal transfer media are more difficult to prepare in that they require coating the substrate with two or more layers.

There is a continuing effort to provide alternative thermal transfer media which can form printed images with high scratch and smear resistance using relatively low print head energies.

SUMMARY OF THE INVENTION

It is an object of the present invention to provide a thermal transfer medium which provides scratch and smear resistant images.

It is another object of the present invention to provide a thermal transfer medium which provides scratch and smear image resistant images using conventional thermal printers.

It is an additional object of the present invention to provide a coating formulation which forms thermal transfer layers with reactive binder components.

It is an additional object of the present invention to provide a thermal transfer medium which provides scratch and smear resistant images through the use of reactive binder components incorporated in one layer.

It is still another object of the present invention to provide a thermal transfer medium which provides scratch and smear resistant images through the use of a reactive binder components and non-reactive pigment and dye components.

It is still a further object of the present invention to provide a thermal transfer medium wherein the molecular weight of the binder increases with printing to provide a scratch and smear resistant image.

These and other objects and advantages of the present invention will become apparent and further understood from the detailed description and claims which follow, together with the annexed drawings.

The above objects are achieved through the use of a thermal transfer medium of the present invention which comprises a flexible substrate with a thermal transfer layer deposited thereon which softens and flows at a temperature below 200° C., said thermal transfer layer comprising an epoxy resin binder, a crosslinker for epoxy resin a sensible material, wherein the epoxy resin and crosslinker rapidly reacts when melt mixed, i.e., are combined at a temperature above their softening temperature or glass transition temperature. The epoxy resin and crosslinker are isolated in separate phases so as not to react without melt mixing and each are also solid at ambient temperature and have a softening point below 200° C. The isolated epoxy resin and crosslinker for epoxy resin soften and melt mix when exposed to the energy of a thermal print head and subsequently react.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
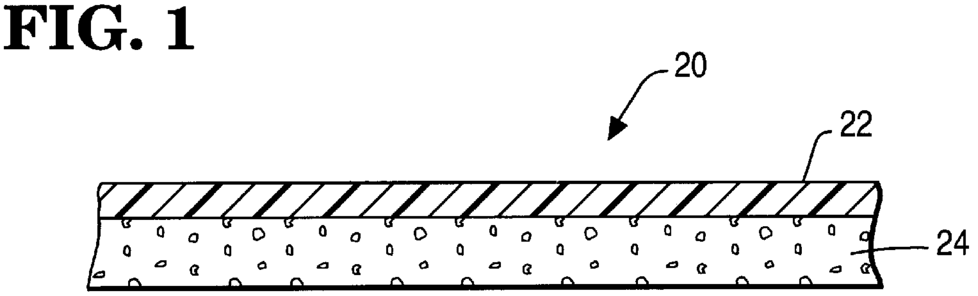
FIG. 1 illustrates a thermal transfer medium of the present invention.

Thermal transfer medium 20, as illustrated in FIG. 1, is a preferred embodiment of this invention and comprises substrate 22 of a flexible material which is preferably a thin smooth paper or plastic-like material and a thermal transfer layer 24. Tissue type paper materials such as 30–40 gauge capacitor tissue, manufactured by Glatz and polyester-type plastic materials such as 14–35 gauge polyester film manufactured by Dupont under the trademark Mylar® are suitable. Polyethylene napthalate films, polyamide films such as nylon, polyolefin films such as polypropylene film, cellulose films such as triacetate film and polycarbonate films are also suitable. The substrates should have high tensile strength to provide ease in handling and coating and preferably provide these properties at minimum thickness and low heat resistance to prolong the life of heating elements within thermal print heads. The thickness is preferably 3 to 50 microns. If desired, the substrate or base film may be provided with a backcoating on the surface opposite the thermal transfer layer.

Thermal transfer layer 24 has a softening point below 200° C., preferably below 150° C. and most preferably from 50° C. to 80° C. Softening temperatures within this range enable the thermal transfer medium to be used in conventional thermal transfer printers, which typically have print heads which operate at temperatures in the range of 100° C. to 250° C., more typically, temperatures in the range of 100° C. to 150° C. The term "softening point" as used herein, refers to the temperature at which a solid material becomes maleable and flowable.

The thermal transfer layer comprises an epoxy resin binder, a crosslinker for epoxy resin and a sensible material. The epoxy resin and crosslinker are selected so as to quickly react when softened and melt mixed, preferably at the operating temperatures of a thermal print head, most preferably from 75° C. to 150° C. Once melt mixed at these temperatures, some combinations of epoxy resin and crosslinkers may be reactive at ambient temperature. The epoxy resin and crosslinker selected are solids at ambient temperature so that they may be isolated in separate phases within the thermal transfer layer. Preferably, the epoxy resin has a glass transition temperature above 50° C. The epoxy resin and crosslinker also have softening temperatures below 200° C., preferably below 150° C., and most preferably in the range 50° C. to 80° C., consistent with the softening temperature requirements of the thermal transfer layer described above. Such softening temperatures allow the epoxy resin and crosslinker to melt mix when heated at temperatures in the range of 50° C. to 250° C., such as by a conventional thermal print head, allowing the crosslinking reaction to proceed. Where the epoxy resin and/or crosslinker have a softening point above 100° C., consideration must be given to employ a print head with an operating temperature sufficiently high to melt mix these components.

The preferred epoxy resins suitable for use in this invention have at least two oxirane groups,

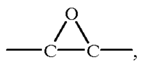

so as to provide significant increases in molecular weight when crosslinked. Crosslinking can also be achieved through hydroxyl groups on the epoxy resin. At least a portion of the epoxy resins used have two or more oxirane groups. The preferred resins include the epoxy novolac resins obtained by reacting epichlorohydrin with phenol/formaldehyde condensates or cresol/formaldehyde condensates. These resins are generally B-stage resins in a partial state of cure which have multiple epoxide groups. A specific example of a suitable epoxy novolac resin is Epon 164 available from Shell Chemical Co.

Preferred epoxy resins also include polyglycidyl ether polymers obtained by reaction of epichlorohydrin with a polyhydroxy monomer such as bisphenol-A. A specific example is that sold under the tradename Araldite GT 7013 by Ciba-Geigy Corp. These polymers are generally linear and have terminal epoxide groups. Polymers with other backbone structures including aliphatic backbones are suitable if the melting/softening point requirements discussed above are met. These include those polyglycidyl ethers obtained by reaction of epichlorohydrin with 1,4-butanediol, neopentyl glycol or trimethlyol propane. The preferred epoxy resins discussed above are suitably reactive when melt mixed with most crosslinkers. The epoxy resins most preferred are typically dependent on the melting/softening points desired which is determined by molecular weight.

Crosslinkers suitable for use in this invention are those conventionally used to cure epoxy resins which satisfy the melting/softening point requirements discussed above, have at least 2 reactive groups and are preferably activated at temperatures within the operating temperature range of conventional thermal print heads and are most preferably highly reactive with epoxies so as to provide significant crosslinking in less than one second once activated by a conventional thermal print head of a thermal printer. Suitable crosslinkers will react with the epoxy resins epoxide groups, hydroxyl groups or both. Some crosslinkers may remain active at ambient temperature once the reaction is initiated. To improve shelf stability of the thermal transfer medium, it is preferable for the crosslinker to have an activation temperature in the range of 60° C.–100° C. Crosslinkers with activation temperatures above 100° C. can be used, provided the activation temperature is below the operating temperature of the print head to be used.

Examples of suitable crosslinkers include polyamines which are prepolymers or oligomers of a multifunctional amine (diamine), with or without another monomer which have at least two primary or secondary amine groups. These polyamine prepolymers/oligomers are often referred to as modified amines. They are prepolymerized to provide a molecular weight which meets the melting point/softening point requirements. Examples of suitable modified amines are sold under the tradename Epi-cure P101 and Ancamine 2014FG sold by Shell Chemical Co. and Air Products, respectively. Aliphatic amine derivatives are another class of suitable polyamines. These include dicyandiamide (dicy) and imidazoles. Other suitable crosslinkers include carboxylic acid functional polyester resins, phenol-formaldehyde resins and amino-formaldehyde resins. Included within the phenol-formaldehyde resins are resols and phenol-novolak resins.

In selecting a combination of epoxy resin binder and crosslinker, their solubility is also considered. To prepare a single thermal transfer layer containing both crosslinker and combination of epoxy resin binder, at least one of the components must be insoluble in the solvent of the coating formulation so as to keep them in separate phases within the thermal transfer layer. Since the solvent and epoxy resin binder comprise the bulk of the coating formulation, it is simpler to employ crosslinkers which are insoluble in the solvent for the coating formulation. However, the crosslinker may be soluble in the solvent used where the epoxy resin binder is suspended in the solvent (insoluble).

To enhance the activity of the crosslinker, an accelerator may be incorporated in the thermal transfer layer, either within or out of the phase which contains the crosslinker. Examples include tertiary amines and TGIC (triglycidylisocyanurate). The accelerators must be solid at ambient temperature and have a softening temperature less than 200° C. Preferably, the softening point of the accelerator is compatible with the softening points of the epoxy resin binder and crosslinker. The accelerator preferably functions at a temperature in the range of from 50° C. to 250° C. to accelerate the crosslinking reaction.

Another component of the thermal transfer layer is a sensible material which is capable of being sensed visually, by optical means, by magnetic means, by electroconductive means or by photoelectric means. The sensible material is typically a coloring agent such as a dye or pigment or magnetic particles. Any coloring agent used in conventional ink ribbons is suitable, including carbon black and a variety of organic and inorganic coloring pigments and dyes, examples of which include phthalocyanine dyes, fluorescent naphthalimide dyes and others such as cadmium, primrose, chrome yellow, ultra marine blue, titanium dioxide, zinc oxide, iron oxide, cobalt oxide, nickel oxide, etc. In the case of the magnetic thermal printing, the thermal transfer coating includes a magnetic pigment or particles for use in imaging or in coating operations to enable optical, human or machine reading of the characters. The magnetic thermal transfer ribbon provides the advantages of thermal printing while encoding or imaging the substrate with a magnetic signal inducible ink. The sensible material is typically used in an amount from about 5 to 50 parts by weight of the total dry ingredients for the coating formulation which provides the thermal transfer layer.

The epoxy resin preferably comprises from 30–65% by weight of the thermal transfer layer based on total solids and the crosslinker preferably comprises 5% to 25% by weight of the thermal transfer layer, based on solids. The crosslinker and epoxy resin are kept in separate phases by forming a polymer binder solution and dispersing the epoxy resin and/or crosslinker in this solution to form a separate phase.

Upon coating this solution onto the substrate, the epoxy resin and/or crosslinker remain dispersed in the polymer binder as part of a separate phase. The epoxy resin or crosslinker can function as the polymer binder by dissolving one in solution and then dispersing the other in the solution. A thermoplastic resin can function as the polymer binder dissolved in the solution and both the epoxy resin and crosslinker can be dispersed therein. Formation of a polymer solution is not necessary where the crosslinker is predispersed within the epoxy resin, such as the amine hardeners used in powder coatings obtained from H. B. Fuller.

The thermoplastic resin preferably has a melting point in the range of 100° C. to 300° C. Thermoplastic resins with melting points in the range of 100° C. to 225° C. are most preferred. Examples of suitable thermoplastic resins are polyvinyl chloride, polyvinyl acetate, vinyl chloride-vinyl acetate copolymers, polyethylene, polypropylene, polyacetal, ethylene-vinyl acetate copolymers, ethylene alkyl (meth)acrylate copolymers, ethylene-ethyl acetate copolymer, polystyrene, styrene copolymers, polyamide, ethylcellulose, epoxy resin, xylene resin, ketone resin, petroleum resin, rosin or its derivatives, terpene resin, polyurethane resin, polyvinyl butyryl, synthetic rubber such as styrene-butadine rubber, nitrile rubber, acrylic rubber and ethylene-propylene rubber. Also suitable are polyvinyl alcohol, ethylene alkyl (meth)acrylate copolymers, styrene-alkyl (meth) acrylate copolymer, saturated polyesters and the like. Suitable saturated polyesters are described in U.S. Pat. No. 4,983,446. It is recognized that mixtures of the above-identified resins can be used. In the viewpoint of transfer sensitivity, it is desirable for the thermoplastic resins to have a low softening temperature. From the viewpoint of image integrity, it is desirable for these resins to have a high softening temperature. The thermoplastic resin is preferably used in an amount of about 5 to 15 weight percent, particularly 10 weight percent based on the weight of total dry ingredients of the coating formulation which forms the thermal transfer layer.

The thermal transfer layer does not require the use of conventional waxes and plasticizers typically used in thermal transfer media, but their use is not excluded from the thermal transfer media of this invention.

The thermal transfer layer may contain conventional additives typically used in conventional thermal transfer media to aid in processing and performance of the thermal transfer layer. These include flexibilizers such as oil, weatherability improvers such a UV light absorbers, scratch and abrasion improvers such as polytetrafluoroethylene and micronized polyethylene and fillers. Amounts of up to 45 weight percent total additives based on total solids can be used in the thermal transfer layer.

The thermal transfer layer can be obtained by preparing a coating formulation and applying it to a substrate by conventional coating techniques such as a Meyer Rod or like wire-round doctor bar set up on a typical solvent coating machine to provide the desired coating thickness which equates to a coating weight preferably between 5 and 11 mg 4 $in^2$. A temperature of approximately 100° F. to 150° F. is maintained during the entire coating process, preferably below 120° F. After the coating formulation is applied to the substrate, preferably 3 to 50 $\mu$n thick, the substrate is passed through a dryer at an elevated temperature to ensure drying and adherence of the coating 24 onto the substrate 22 in making the transfer ribbon 20, but without activating the crosslinker. The thermal transfer layer can be fully transferred onto a receiving substrate such as paper or synthetic resin at a temperature in the range of 75° C. to 200° C. Following application, the receiving substrate may be exposed to a post-bake of up to 24 hours to ensure completion of the reaction and improve scratch resistance.

The coating formulations of this invention contain binder components such as the epoxy resin binders with or without thermoplastic resins and/or waxes as described above, and a sensible material, as described above. Another significant component of the coating formulation is the solvent for the epoxy resin binder and crosslinker. In addition to vaporizing at the operating temperatures of a thermal print head, the solvent can not solubilize at least one of the reactive components, either the epoxy resin binder or the crosslinker or both. Suitable solvents include those typically considered poor solvents such as mineral spirits (Lacolene). Others include ester solvents such as ethyl, propyl and butyl acetate. The coating formulation is preferably based on organic solvents with a boiling point in the range of 150° C. to 190° C. and preferably contains solids in an amount in the range of about 10 to 50 weight percent. Most preferably, the coating formulation contains about 30 percent solids. To prepare a suitable coating formulation which forms the thermal transfer layer, a polymer binder is typically dissolved in a solvent. This can be the epoxy resin, the crosslinker or the thermoplastic resin binder. Once dissolved, the polymer solution is agitated and the remaining reactive components (either the epoxy resin, crosslinker or both) are dispersed therein. The mixture is transferred to an attritor and the sensible material is added thereto with agitation at a temperature less than the activation temperature for the crosslinker for about 2 hours, preferably below 120° F. If the crosslinker is dispersed within the epoxy resin in advance, such as with powder coatings, a polymer solution need not be prepared.

Figure 2:
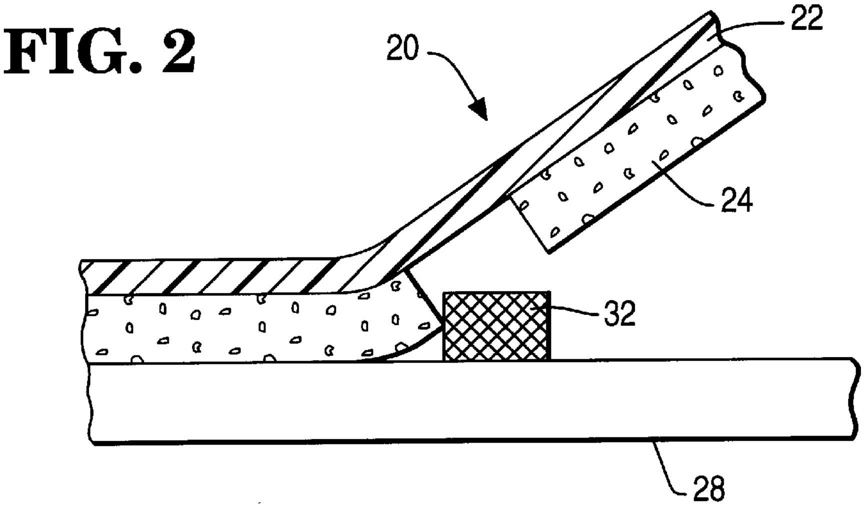
FIG. 2 illustrates a thermal transfer medium of the present invention after thermal transfer to a substrate.

The thermal transfer ribbon provides the advantages of thermal printing. When the thermal transfer layer is exposed to the heating elements (thin film resistor) of the thermal print head, the epoxy resin and crosslinker melt mix, reaction commences and the thermal transfer layer is transferred from the ribbon to the receiving substrate to produce a precisely defined image on the document. FIG. 2 illustrates image 32 on receiving substrate 28 following transfer from thermal transfer layer 24 of thermal transfer medium 20. Once initiated, the reaction proceeds rapidly, preferably until at least 99% complete.

Figure 3:
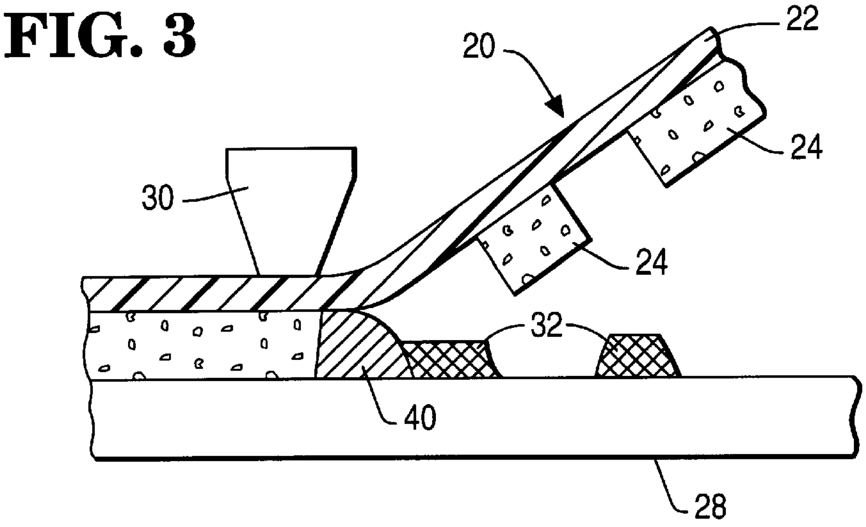
FIG. 3 illustrates a thermal transfer medium of the present invention in a printing operation wherein thermal transfer is taking place.

FIG. 3 shows use of thermal transfer medium 20 in a printing operation. More particularly, FIG. 3 shows the heating of thermal transfer medium 20 by print head 30 where mixing and reaction of the crosslinker and epoxy resin takes place during transfer of thermal transfer layer 24 onto receiving substrate 28. The heat from the print head 30 softens a portion of the thermal transfer layer 24 resulting in mixed portion 40. Reaction of the epoxy resin and crosslinker in mixed portion 40 results in image 32.

The images obtained from the thermal transfer layers of the present invention contain higher molecular weight epoxy resin and therefore, show greater smear and scratch resistance.

The entire disclosure of all applications, patents and publications, cited above and below, are hereby incorporated by reference.

Without further elaboration, it is believed that one skilled in the art can, using the preceding description, utilize the present invention to its fullest extent. The following preferred embodiments are, therefore, to be construed as merely illustrative and not limitative of the remainder of the disclosure in any way whatsoever.

EXAMPLES

Example 1

A coating formulation with the components within Table 1 is prepared by grinding the epoxy component to a particle size of less than 800 microns; dissolving the EVA binder in solvent and adding the epoxy and crosslinker while under agitation so as to suspend both components. The mixture is transferred to an attritor with a cooling jacket. The attritor is started and carbon black added, ensuring that the temperature of contents of the vessel did not exceed 120° F. The mixture is ground for two hours at 200–250 rpm.

TABLE 1

| | Use | % Dry | Dry (grams) | Wet (grams) |
|---|---|---|---|---|
| Mineral Spirits (Lacolene) | Solvent | NA | NA | 450.0 |
| Ethylene vinyl acetate (EVA)[1] | Binder | 10.0 | 15.0 | 15.0 |
| Diglycidyl ether bisphenol A (DGEBA)[2] | Epoxy | 65.0 | 97.5 | 97.5 |
| Modified polyamine (1)[4] | Hardener | 10.0 | 15.0 | 15.0 |
| Carbon black | Pigment | 15.0 | 22.5 | 22.5 |

The coating formulation is applied to polyester terephthalate (PET) film with coat weights in the range of 5–10 mg/4 $in^2$ with conventional equipment.

Example 2

A coating formulation with the components of Table 2 is prepared by dissolving the diglycidyl ether Bisphenol-A and novolac epoxy in the butyl acetate solvent, adding modified polyamine, and a slip additive, such as PTFE[6] and PE[7], under agitation so as to suspend the modified polyamine and transferring the mixture to an attritor with a cooling jacket. The attritor is started and carbon black added, ensuring that the temperature of the vessel does not exceed 120° F. The mixture is ground for 2 hours at 200–250 rpm.

TABLE 2

| | Use | % Dry | Dry (grams) | Wet (grams) |
|---|---|---|---|---|
| Butyl acetate | Solvent | NA | NA | 300.0 |
| Diglycidyl ether bisphenol A (DGEBA)[2] | Binder/Epoxy | 55.0 | 41.25 | 41.25 |
| Novolac epoxy[3] | Binder/Epoxy | 5.0 | 3.75 | 3.75 |
| Modified polyamine (2)[5] | Hardener | 15.0 | 11.25 | 11.25 |
| Slip additive | | 10.0 | 7.5 | 7.5 |
| Carbon black | Pigment | 15.0 | 11.25 | 11.25 |

The coating formulation is applied to polyester terephthalate (PET) film with coat weights in the range of 5–10 mg/4 in$^2$ with conventional equipment.

MATERIALS

| Chemical Name | Trade Name | Manufacturer | City | State |
|---|---|---|---|---|
| 1 Ethylene vinyl acetate (EVA) | Escorene MV02514 | Exxon Chemical Co. | Houston | TX |
| 2 Diglycidyl ether bisphenol A (DGEBA) | Araldite GT7013 | Ciba-Geigy Corporation | Hawthorne | NY |
| 3 Novolac epoxy | Epon 164 | Shell Chemical Co. | Houston | TX |
| 4 Modified polyamine (1) | Epicure P101 | Shell Chemical Co. | Houston | TX |
| 5 Modified polyamine (2) | Ancamine 2014FG | Air Products | Allentown | PA |
| 6 Polytetrafluoroethylene (PTFE) | Polyfluo 150 | Micro Powders Inc. | Tarrytown | NY |
| 7 Micronized polyethylene (E) | MPP 620XF | Micro Powders Inc. | Tarrytown | NY |

Print samples from a ribbon of Example 1 using a TECB30 printer at headsetting 1, speed 2" and energy+1, are tested for solvent resistance. The print samples are exposed to water, Lacolene, 409® Cleaner, methanol, toluene, butylacetate, gasoline and Goo Gone, and subsequently passed over with a plastic pad. No smearing is detected for the print samples treated with water, Lacolene, 409® Cleaner, gasoline or Goo Gone after 60 passes. The print samples started to smear at 50 passes after treatment with toluene; at 32 passes after treatment with methanol; and 10 passes after treatment with butylacetate.

The print samples as produced above were baked at 105° C. for 5, 10 and 15 minutes. Those baked for 5 minutes showed no smear at 60 passes after treatment with water, Lacolene, methanol, toluene or butylacetate. Those treated with 409® Cleaner showed smear after 48 passes. Those treated with acetone showed smear after 10 passes.

Those baked for 10 minutes following printing showed no smear at 60 passes after treatment with water, Lacolene, 409® Cleaner, methanol, toluene or butylacetate. Those treated with acetone showed smear after 16 passes.

Print samples baked for 15 minutes at 105° C. and treated with water, Lacolene, 409® Cleaner, methanol, acetone, toluene or butylacetate showed no evidence of smearing after 60 passes.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A coating formulation which forms thermal transfer layers of thermal transfer media, said coating formulation comprising an epoxy resin binder, a crosslinker which initiates crosslinking with the epoxy resin binder, a sensible material, and a solvent which does not solubilize the crosslinker, the epoxy resin binder or both, wherein the epoxy resin and crosslinker are each solid at ambient temperature and have a softening point below 200° C. so as to melt mix at a temperature in the range of 50° C. to 250° C.

2. A coating formulation as in claim 1 which additionally comprises a crosslinking accelerator which is solid at ambient temperature and accelerates the crosslinking reaction between the epoxy resin binder and crosslinker at temperatures in the range of from 50° C. to 250° C.

3. A coating formulation which forms thermal transfer layers of thermal transfer media, said coating formulation comprising an epoxy resin binder, a crosslinker which initiates crosslinking with said epoxy resin binder, a sensible material, a thermoplastic resin binder with a softening point below 200° C., and a solvent which does not solubilize the crosslinker but does solubilize the epoxy resin binder, wherein the epoxy resin and crosslinker are each solid at ambient temperature, reactive once melt mixed and have a softening point below 200° C. so as to melt mix at a temperature in the range of 50° C. to 250° C.

4. A coating formulation as in claim 1, wherein the thermal transfer layer contains from 30–65 weight percent epoxy resin and 15 to 25 weight percent crosslinker, based on the total weight of solids in the thermal transfer layer.

5. A coating formulation as in claim 1, wherein the epoxy resin is diglycidyl ether bisphenol A and the crosslinker is a polyamine.

6. A coating formulation as in claim 1, wherein the crosslinker is activated to initiate crosslinking with the epoxy resin binder at temperatures in the range of 60° C.–100° C.

7. A coating formulation as in claim 1 which comprises more than one epoxy resin binder.

8. A coating formulation as in claim 1 which comprises more than one crosslinker.

9. A coating formulation as in claim 1 which is free of wax.

10. A coating formulation as in claim 1 which is free of plasticizer.

11. A coating formulation as in claim 1, wherein the crosslinker is selected from the group consisting of polyamines, carboxylic acid functionalized polyesters, phenol-formaldehyde resins and amine-formaldehyde resins.

* * * * *